June 18, 1935. A. L. SMITH 2,005,598
DEVICE FOR INTRODUCING DRY GRANULAR MATERIALS INTO THE SOIL
Filed Jan. 3, 1935 3 Sheets-Sheet 1
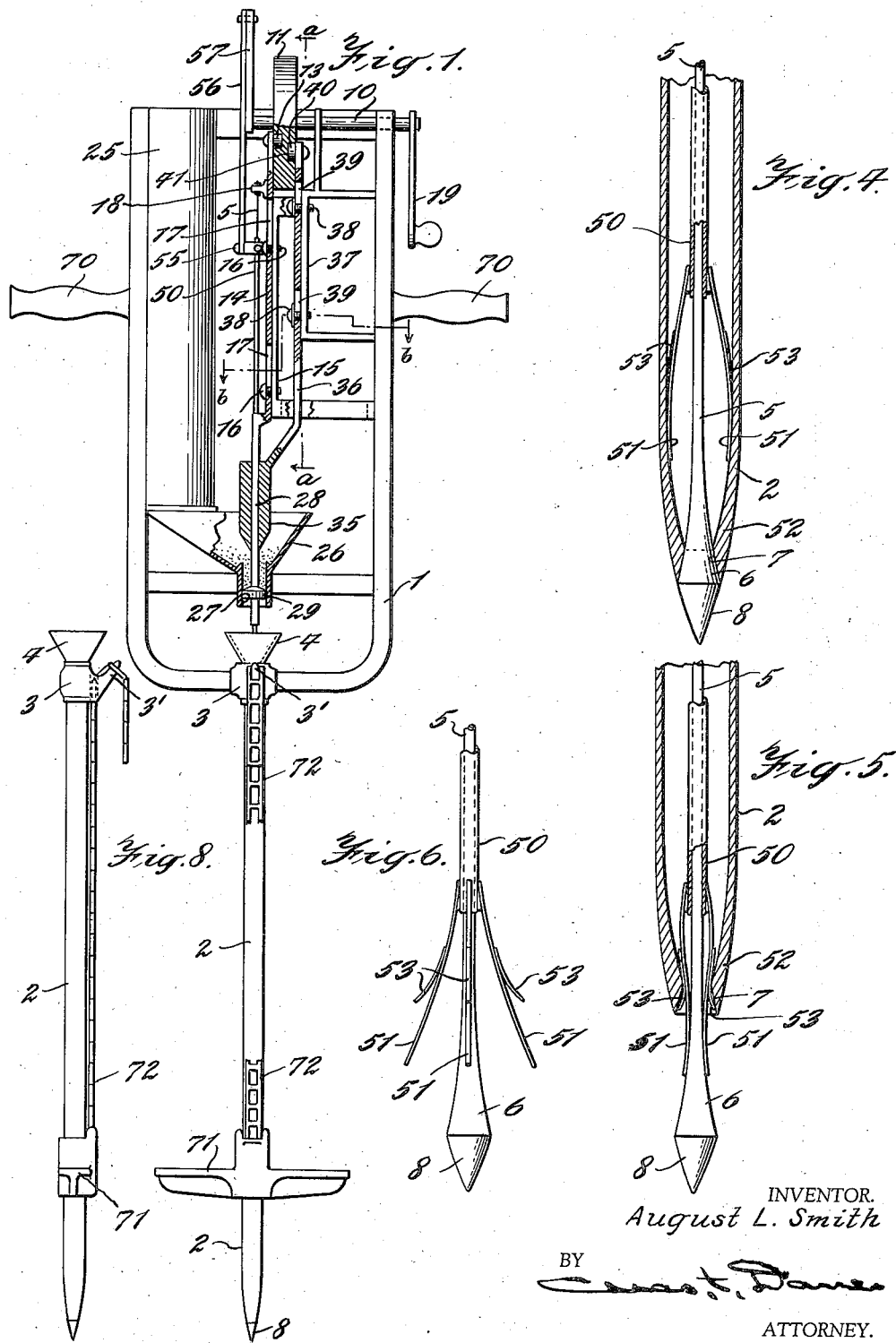
INVENTOR.
August L. Smith
BY
ATTORNEY.

June 18, 1935.  A. L. SMITH  2,005,598
DEVICE FOR INTRODUCING DRY GRANULAR MATERIALS INTO THE SOIL
Filed Jan. 3, 1935  3 Sheets-Sheet 2
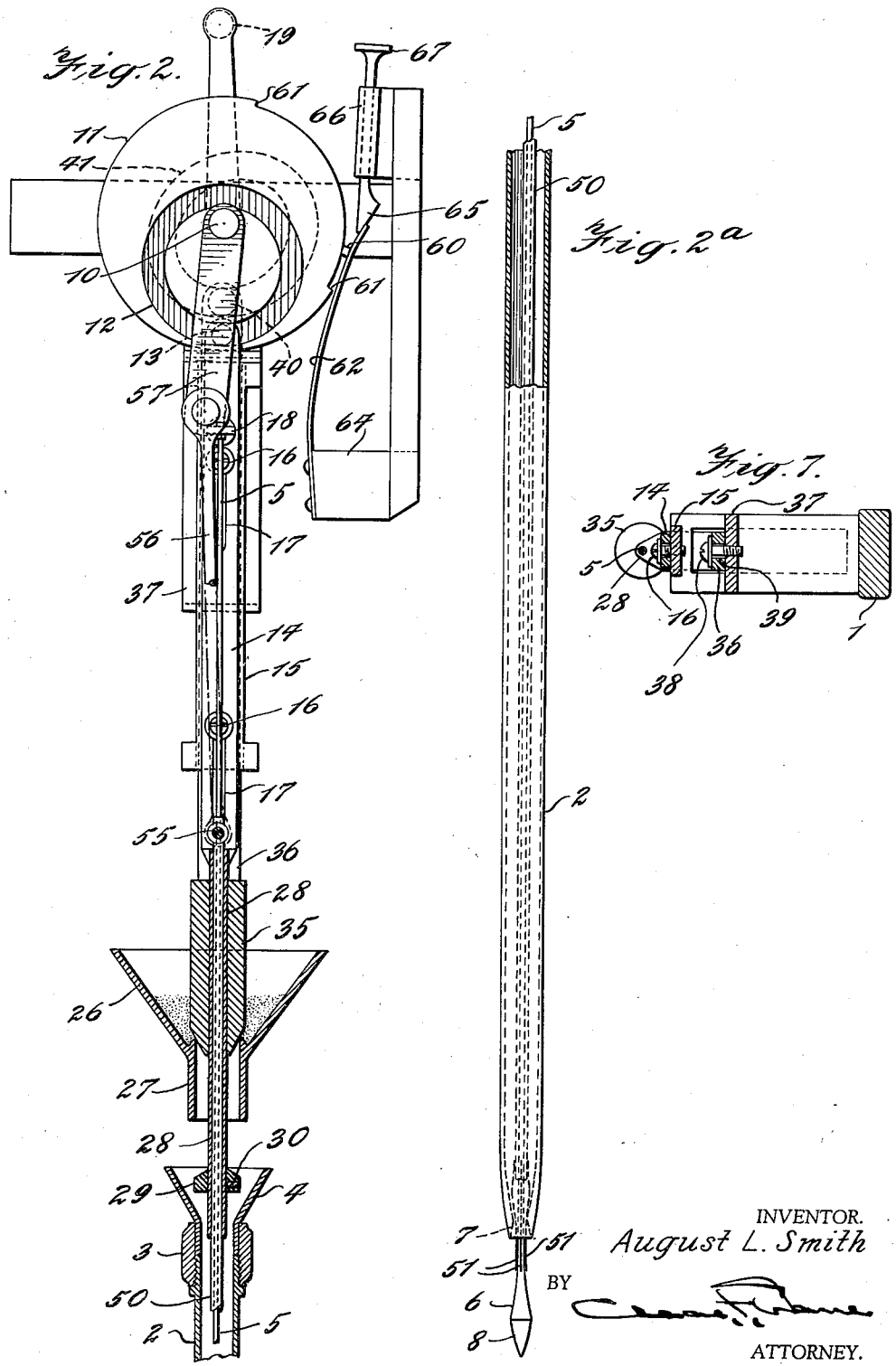
INVENTOR.
August L. Smith
BY
ATTORNEY.

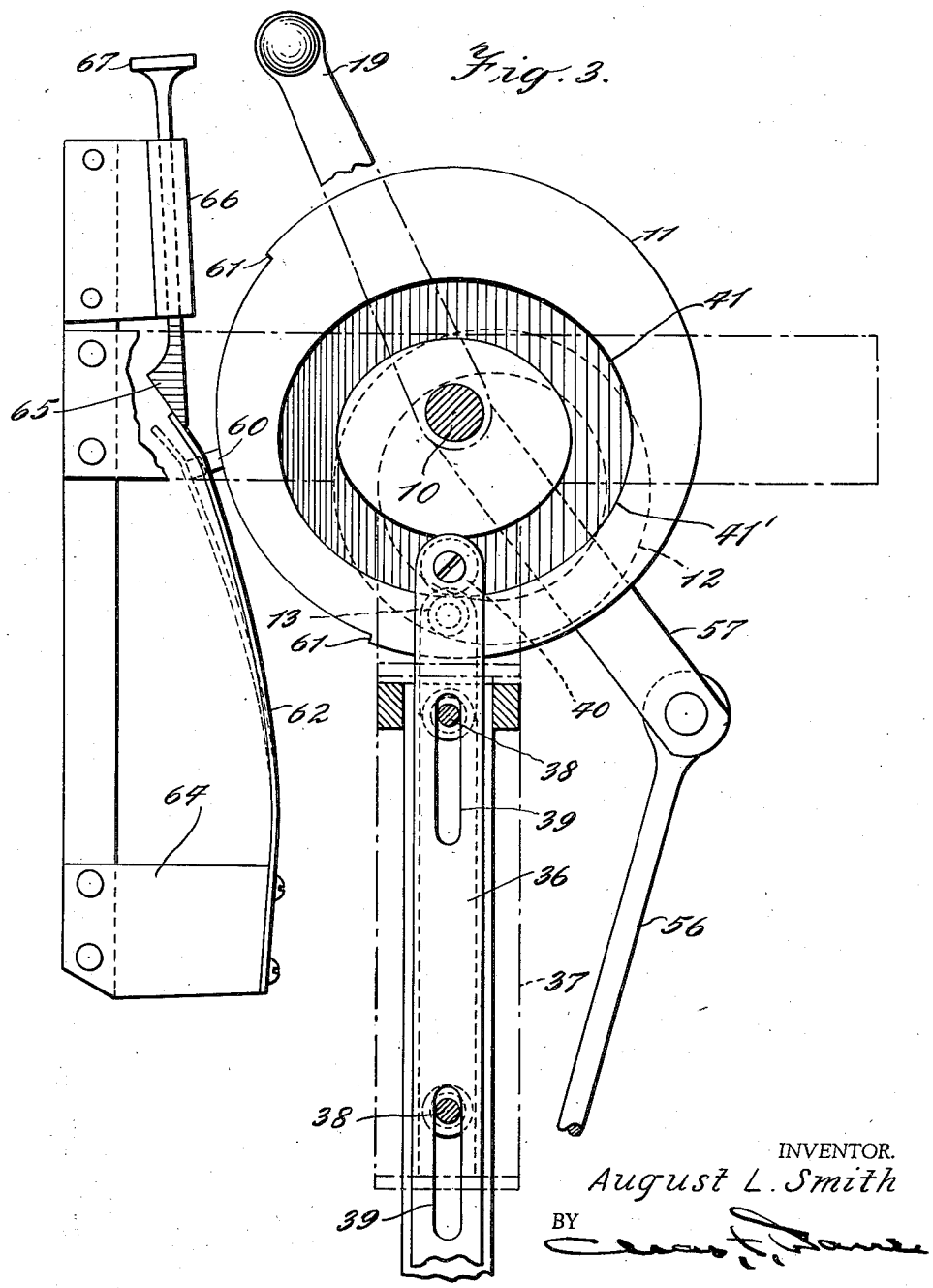

Patented June 18, 1935

2,005,598

UNITED STATES PATENT OFFICE 2,005,598

DEVICE FOR INTRODUCING DRY GRANULAR MATERIALS INTO THE SOIL

August L. Smith, Harrison, N. Y.

Application January 3, 1935, Serial No. 198

14 Claims. (Cl. 111—96)

The invention relates to a device for introducing into the soil dry granular materials, such for example as fertilizers for trees, shrubbery and the like; fumigants for destroying soil insects in greenhouse beds and benches; and repellants to discourage moles and mice in gardens and lawns.

In a device of this character it is desirable that it be capable of delivering material in fairly accurately measured charges or "doses" and of doing this with certainty. One of the outstanding troubles with devices of this kind as heretofore made, has been the clogging of the discharge tube at its delivery end by reason of the soil or like material being drawn or forced therein during the use of the device; such clogging obviously interfering with the free and complete discharge of the material being used.

With the foregoing in mind, it has been the main object of my invention to provide an improved device of the kind in question, which will be effective during use to maintain the discharge tube thereof in an open and unobstructed condition whereby to assure the free and complete discharge therefrom of the material being used. This object is attained by means of the new and novel construction and combinations of parts embodying my invention as hereinafter described and claimed.

Other objects and advantages of the invention will be referred to in the detailed description of the invention which follows.

Referring now to the accompanying drawings forming part hereof—

Fig. 1 is an elevation, partly in section, of a device embodying my invention.

Fig. 2 is an enlarged view, in elevation and section, of a part of the main operating parts of the device, as viewed from the left in Fig. 1, and showing the movable parts in different positions from that in the latter figure.

Fig. 2a is a similar view of that part of the device shown as broken away at the bottom in Fig. 2, with the parts in corresponding position.

Fig. 3 is an enlarged section on the line a—a of Fig. 1, but with the movable parts in different positions from those in the latter figure.

Fig. 4 is an enlarged detail, partly in section, of the lower end of the discharge tube and contained parts, showing the point or tube closure member in tube closing position.

Fig. 5 is a similar view showing the closure member in projected or open position and with certain associated scraper blades in corresponding position.

Fig. 6 is a detail showing the closure member and scraper blades with their supporting sleeve removed from the tube, showing the spring blades in their normal or uncompressed condition.

Fig. 7 is an enlarged section on the line b—b of Fig. 1.

Fig. 8 is a side view of the discharge tube and adjustable foot-rest mounted thereon, together with the foot-rest supporting and adjusting means, as viewed from the left in Fig. 1.

To explain in detail, I indicates the body or frame of the device which may be of any suitable construction and design, the same preferably being formed of metal and in open skeleton form to provide a strong rigid structure.

Rigidly attached to the lower side of this frame is a tube 2, adapted to be inserted into the ground and through which the fertilizer, fumigant or other material being used is adapted to be passed from a container supported in the frame. This tube, as shown in Fig. 2, is threaded at its upper end into a coupling member 3 in the lower end of the frame, which coupling at its upper side carries a funnel 4 opening into the tube as shown.

Extending through the tube is a rod 5 which, at its lower end, is tapered outwardly to form an enlarged head 6. This head is adapted to be seated within an outwardly flaring correspondingly shaped seat 7 in the end of the tube for the purpose of normally closing the latter. Below the head portion 6, the rod is formed with a pointed extension 8 merging with the exterior wall of the tube and being adapted to facilitate the insertion of the latter into the ground when being forced therein. The head 6, seating into the seat 7 in the end of the tube, not only serves to close the latter but also serves to firmly support the point 8 relatively to the tube against end pressure when being forced into the ground.

The head 6 is adapted to be projected from its closed position in order to open the tube and permit of the delivery therethrough of a charge of the material being used and thereafter to be returned to closed position, both of these opening and closing operations taking place while the tube is in the ground. Any suitable means may be employed for thus operating the head 6. As here shown, I mount a shaft 10 in the upper part of the frame 1 and attach hereto a disk 11 having a cam groove 12 in one face thereof. Engaging within this cam groove is a roller 13 attached to a slide 14 which is mounted for vertical sliding movement on a frame bracket 15 by means of headed pins or screws 16 on said bracket engaging the slide through elongated slots 17 therein. Attached to one side of said slide 14 is a bracket arm 18 with which is connected the upper end of the rod 5 which carries the head 6. Thus by rotating the shaft 10 by means of a crank handle 19 at one end thereof, the attached cam disk will effect vertical reciprocation of the engaged slide 14 and connected rod 5 to thereby move the head 6 to and from its tube closing position.

The material to be introduced into the ground through the tube 2 is preferably delivered in measured charges. To accomplish this I locate within the frame 1 a magazine 25 to receive the material in bulk, which magazine connects through its lower end with a trough 26 having at its lower side a discharge cylinder 27 positioned centrally above the funnel 4. Extending through this cylinder 27, which I term the "measuring container" is a tubular rod 28 which at its upper end connects with the slide 14 for movement therewith and adjacent its lower end has connected thereto a disk 29 substantially corresponding in size with the inner diameter of the cylinder 27 so as to close the latter when positioned therein.

As the tube closure head 6 and the measuring container closure disk 29 are both connected through the rods 5 and 28 respectively with the cam driven slide 14, it will be understood that they have a fixed relation to each other. According to this, when the head 6 is in closed position, the disk 29 will be within the measuring cylinder or container to close the same as shown in Fig. 1, and when the head is projected to open position as shown in Fig. 5, the disk 29 will be moved to a position below the measuring container as shown in Fig. 2 to thereby release the charge contained in said container and permit its discharge by gravity through the now open tube 2. As a means for adjusting the amount of the charge received in the measuring container, the disk 29 is adjustable on its supporting rod, as by means of a set screw 30, whereby to vary its vertical position within the cylinder.

In connection with the disk 29 and as a part of the charge measuring means, I employ a shut-off member 35 which is operative to engage the upper end of the container 27 upon the lowering of the disk and shut off the further feed of the material into the container. This shut-off is here shown in the form of a block slidably mounted upon the rod 28 and having a lower tapered end to facilitate its passage through the material in the trough 26 when being lowered to shut-off position. At its upper end this shut-off is connected to a slide 36 which is mounted for sliding movement on a frame bracket 37 by means of headed pins or screws 38 on said bracket engaging the slide through elongated slots 39 therein. Said slide in turn is provided at its upper end with an attached roller 40 which engages within a cam groove 41 in the cam disk 11. Rotation of this disk in the manner hereinbefore described will impart a reciprocating movement to the slide 36 and connected shut-off 35 to cause the latter to shut off the feed of the material through the cylindrical measuring container upon the lowering of the plunger disk 29 and thereafter to move upwardly from such position and permit feed of the material into the container upon the return of said disk to its container closing position.

In the use of this device, when the tube 2 is inserted into the ground and the end closure or head 6 is opened and closed, in the manner hereinbefore referred to, there is likelihood of the soil or other foreign matter getting into the open end of the tube and choking up the same in such way as to interfere with the proper seating of the head 6 within its seat at the end of the tube. This choking of the tube is particularly liable to result by reason of the damp soil sticking to the head 6 and its supporting rod or stem and being carried thereby into the tube upon the upward withdrawal of same to seating position. In accordance with my present invention and as one of the most important features thereof I provide means for positively preventing such choking of the tube. This means, in the form here shown, comprises a carrier member 50 supported for movement within and lengthwise of the tube 2, and having attached thereto at its lower end a series of scraper fingers 51 which are preferably in the form of spring blades arranged with their free ends in contact with the inner wall of the tube, as shown in Fig. 4. In the use of the device and following the discharge of the material being used, the carrier 50 is lowered to thereby cause the attached scraper fingers to move downward in scraping engagement with the inner wall of the tube and remove any adhering material therefrom, and also to pass through the end of the tube and into engagement with the projecting closure member 6, as shown in Fig. 5, to scrape any adhering soil therefrom preliminary to its withdrawal to tube closing position. Such engagement of the scraper fingers with the head 6 and its supporting rod at a point below the open end of the tube 2 is positively assured by reason of the tube having a contracted neck just within its open end, as at 52, the wall of which acts to direct and hold the ends of the fingers into engagement with said head and its supporting rod, as shown in Fig. 5.

As a means of supplementing the action of the scraper fingers 51, I provide a second set of spring fingers 53 which are of less length than the main fingers and attached at one end to the latter with their free ends extending into engagement with the inner wall of the tube. These supplemental fingers act as a "follow-up" of the main fingers and, after passing through the neck of the tube, spring laterally into engagement with the wall of the seat 7, as shown in Fig. 5, to also clean this of any adhering material. These scraper fingers not only act to remove adhering soil from the engaged parts as described, but also act to remove any of the material being used which has become lodged on said parts because of dampness or otherwise.

The carrier 50 for the scraper fingers, as here shown, is in the form of a tubular rod which is connected at its upper end through an attached coupling 55 and link 56 with the free end of a crank-arm 57 fixedly attached to the operating shaft 10. Thus movement of the latter shaft to operate the cam disk 11 and associated parts as hereinbefore described, will also act through the crank-arm 57 and connecting parts to raise and lower the carrier 50 with resulting operation of the attached scraper fingers. The tubular rod constituting the carrier 50 is slidably supported on the rod 5 which carries the tube closure head 6, and this tubular rod 50 in turn slidably extends through the tube 28 which carries the plunger disk 29; such nesting of these parts serving as a convenient supporting and guiding means for each other.

The timing in the movement of the parts is such that the shut-off 35 is in its lowered closed position (Fig. 2) during the tube opening and closing movements of the pointed head 6 and the scraping movements of the scraper fingers 51—53 so as to limit the delivery of the device to a single charge or dose at each operation thereof. To provide for this, the cam groove 41 in the disk 11 controlling the movement of the shut-off is formed with a "dwell" portion therein, as indicated generally at 41', which maintains the shut-off in closed position during the period stated.

In order to make the cleaning or scraping operation more effective, it is desirable that the scraping fingers be given several up and down or scraping movements. This obviously may be done by an oscillating movement of the shaft 10, but it is of course desirable that the extent of oscillating movement be limited to the dwell of the cam groove 41 in order to keep the shut-off closed during such movement. This I do by means of a latch device 60 which is movable to and from a position for engagement with the periphery of the cam disk 11 between two spaced shoulders 61, 61 thereon, the engagement of the latch with these shoulders serving to substantially limit the movement of the shaft 10 and associated parts, including the scraper operating crank-arm 57, to the said dwell portion of the cam.

The latch device may be of any suitable construction. As here shown, it is in the form of a pin or finger carried on the free end of a flat spring 62 which is attached to a stationary part 64 of the frame. Normally the latch is held in a retracted inoperative position out of the path of the shoulders 61, as shown by dotted lines in Fig. 3, by means of a retaining device 65 which is slidably mounted in a stationary part 66 of the frame with its lower end in engagement with the free end of the latch spring and its upper end provided with a handle member or button 67. By raising this retaining device, the latch will move into operative shoulder engaging position under the influence of the spring 62, as shown by the full line position of Fig. 3.

As a means to facilitate the handling of the device, it is provided with handles 70, 70 rigidly attached to the opposite sides of the frame or body portion 1, and is also preferably provided with a foot-rest 71 slidably mounted on the tube 2 for vertical adjustment thereon. As here shown, the foot-rest is attached to the lower end of an open-link chain 72 which passes upwardly through an opening in the frame coupling 3 where it is engaged and held by a hook 3' on the latter entering one of its links. This permits of the foot-rest being readily adjusted to any desired point in the length of the tube by simply releasing the chain from the hook, raising or lowering the foot-rest as desired, and thereafter reengaging the chain with the hook.

In the use of the device, the handle 19 will be placed in "closed" position, which is that indicated in Fig. 1, whereby the tube closure head 6 will be in closed position, the plunger disk 29 in its closing position in the lower end of the measuring container, and the shut-off 35 in its raised or open position above said measuring container whereby to permit of the latter being filled by the fertilizer or other material being used. The foot-rest is then set a short distance above the point of the discharge tube, and the operator, grasping the device by the handles, rests his weight on the foot-rest and forces the tube into the ground. If the ground is hard, the foot-rest may be successively raised on the tube and the forcing operation repeated until the tube has been forced into the ground to the desired depth. Thereafter the tube is slightly raised to leave an opening in the ground below or just in advance of the end of the tube, after which the operator, holding the device by one of its handles, rotates the control handle 19 to bring the parts from their so-called "closed" position, in which the head 6 is closed as shown in Fig. 1, to their so-called "open" position, in which said head is in open or projected position as shown in Fig. 5. Such operation effects the delivery of a charge of the material from the measuring container to the tube and from thence out through the open end of the latter into the ground. Following such delivery, the handle is further moved to raise the head 6 to its closed position and at the same time return the plunger disk 29 and the shut-off 35 from their lowered position shown in Fig. 2, which they assume upon the delivery of a charge, to their normal position shown in Fig. 1. During the opening and closing movements of the head 6, the scraper device is also operated in the manner hereinbefore described to dislodge any material sticking to the inner wall of the tube 2 and the closure head 6, said scraper withdrawing into the tube before the final closing of the head 6 as shown in Fig. 4.

Having thus set forth one particular embodiment of my invention, I wish it to be understood that the construction disclosed may be more or less materially modified without departure from the spirit of the invention as pointed out in the appended claims.

What I claim is:

1. A device of the character described comprising a body portion having a connected discharge tube, a closure member at the discharge end of said tube normally closing the same and being projectable therefrom to open the tube, and cleaning means within the tube operative to remove material therefrom when the closure member is in open position.

2. A device of the character described comprising a body portion having a connected discharge tube, a closure member at the discharge end of said tube normally closing the same and being projectable therefrom to open the tube, and scraping means cooperative with the inner wall of the tube to remove material therefrom when the closure member is in open position.

3. A device of the character described comprising a body portion having a connected discharge tube, a closure member at the discharge end of said tube normally closing the same and being projectable therefrom to open the tube, and scraping means cooperative with the closure member when the latter is in open position to remove adhering material therefrom.

4. A device of the character described comprising a body portion having a connected discharge tube, a closure member at the discharge end of said tube normally closing the same and being projectable therefrom to open the tube, and a reciprocable carrier within the tube having attached scraper members for engagement with both the inner wall of the tube and the closure member when the latter is in open position.

5. A device of the character described comprising a body portion having a connected discharge tube, a rod in said tube having one end projecting through the discharge end of the tube and normally closing the same, said rod being movable to shift its end to and from tube closing position, and a reciprocable carrier within the tube having attached scraper members for engagement with said rod when the latter is in its projected tube opening position.

6. A device of the character described comprising a body portion having a connected discharge tube formed with an outwardly flaring seat at its discharge end, a rod in said tube having a pointed end projecting through the discharge end of the tube and formed with a tapering portion back of its point to fit within the said seat at the end of the tube, and a reciprocable carrier within the tube having attached scraper members for engagement with the inner wall of the tube and with the said rod when the latter is in projected tube opening position.

7. A device of the character described comprising a body portion having a connected discharge tube, a closure member at the discharge end of said tube normally closing the same and being projectable therefrom to open the tube, means for delivering a charge into the tube, and operating means for both the closure member and the charge delivery means effective to deliver the charge into the tube upon the opening of the closure member.

8. A device of the character described comprising a body portion having a connected discharge tube, a closure member at the discharge end of said tube normally closing the same and being projectable therefrom to open the tube, a charge receiving container opening into the tube, means for retaining a measured charge in said container, and means for operating said charge retaining means to release the charge into the tube.

9. A device of the character described comprising a body portion having a connected discharge tube, a closure member at the discharge end of said tube normally closing the same and being projectable therefrom to open the tube, a charge receiving container opening into the tube, means for retaining a measured charge in said container, and operating means for both the tube closure member and the charge retaining means effective to release the charge upon the opening of the closure member.

10. A device of the character described comprising a body portion having a connected discharge tube, a closure member at the discharge end of said tube normally closing the same and being projectable therefrom to open the tube, a charge receiving container opening into the tube, means for retaining a charge in said container, a shut-off movable to and from a position to close the container, and operating means for the shut-off, the tube closure member and the charge retaining means, effective to close the shut-off, open the tube closure member and release the charge from the container.

11. A device of the character described comprising a body portion having a connected discharge tube, a closure member at the discharge end of said tube normally closing the same and being projectable therefrom to open the tube, reciprocable cleaning means within the tube operative to remove material therefrom when the closure member is in open position, operating means for both the closure member and the cleaning means, and means for maintaining the closure member open during repeated reciprocations of the cleaning means.

12. A device of the character described comprising a body portion having a connected discharge tube, a closure member at the discharge end of said tube normally closing the same and being projectable therefrom to open the tube, reciprocable scraping means cooperative with the closure member when the latter is in open position to remove adhering material therefrom, operating means for both the closure member and the scraping means, and means for maintaining the closure member open during repeated reciprocations of the scraping means.

13. A device of the character described comprising a body portion having a connected discharge tube, a closure member at the discharge end of said tube normally closing the same and being projectable therefrom to open the tube, reciprocable scraping means cooperative with both the inner wall of the tube and the closure member when the latter is in open position, operating means for both the closure member and the scraping means, and means for maintaining the closure member open during repeated reciprocations of the scraping means.

14. A device of the character described comprising a body portion having a connected discharge tube, a closure member at the discharge end of said tube normally closing the same and being projectable therefrom to open the tube, reciprocable cleaning means within the tube operative to remove material therefrom when the closure member is in open position, operating means for both the closure member and the cleaning means including a common actuating shaft, and latching means for limiting the movement of said shaft to maintain the closure member in open position during repeated reciprocations of the cleaning means.

AUGUST L. SMITH.